United States Patent
Suh et al.

(10) Patent No.: US 12,246,703 B2
(45) Date of Patent: Mar. 11, 2025

(54) VEHICLE MOTION CONTROL APPARATUS AND METHOD THEREOF

(71) Applicants: Hyundai Motor Company, Seoul (KR); Kia Corporation, Seoul (KR); Korea University Of Technology And Education Industry-University Cooperation Foundation, Cheonan-Si (KR)

(72) Inventors: Jee Yoon Suh, Incheon (KR); Seung Han You, Seoul (KR); Wan Ki Cho, Cheonan-Si (KR); Han Byeol Gil, Cheonan-Si (KR); Chang Jun Jeon, Cheonan-Si (KR)

(73) Assignees: Hyundai Motor Company, Seoul (KR); Kia Corporation, Seoul (KR); Korea University Of Technology And Education Industry-University Cooperation Foundation, Cheonan-Si (KR)

( * ) Notice: Subject to any disclaimer, the term of this patent is extended or adjusted under 35 U.S.C. 154(b) by 348 days.

(21) Appl. No.: 17/886,328

(22) Filed: Aug. 11, 2022

(65) Prior Publication Data
US 2023/0211772 A1     Jul. 6, 2023

(30) Foreign Application Priority Data
Jan. 4, 2022    (KR) ........................ 10-2022-0001132

(51) Int. Cl.
| | | |
|---|---|---|
| *B60W 30/045* | (2012.01) | |
| *B60N 2/00* | (2006.01) | |
| *B60W 30/09* | (2012.01) | |
| *B60W 40/08* | (2012.01) | |

(Continued)

(52) U.S. Cl.
CPC ......... *B60W 30/045* (2013.01); *B60N 2/0027* (2023.08); *B60W 30/09* (2013.01);
(Continued)

(58) Field of Classification Search
CPC .... B60W 30/045; B60W 30/09; B60W 40/08; B60W 40/105; B60W 40/109; B60W 40/114; B60W 40/13; B60N 2/002
(Continued)

(56) References Cited

U.S. PATENT DOCUMENTS

| | | |
|---|---|---|
| 6,360,150 B1 | 3/2002 | Fukushima et al. |
| 6,449,542 B1 | 9/2002 | Bottiger et al. |

(Continued)

FOREIGN PATENT DOCUMENTS

| | | |
|---|---|---|
| JP | 2006-117067 A | 5/2006 |
| KR | 10-0863550 B | 10/2008 |
| KR | 10-1298388 B | 8/2013 |

*Primary Examiner* — Yazan A Soofi
(74) *Attorney, Agent, or Firm* — Morgan, Lewis & Bockius LLP

(57) ABSTRACT

An apparatus and a method for controlling motion of a vehicle to improve turning motion performance are provided. The processor determines a riding position of a user, receives information about a steering angle of the vehicle, and outputs a vehicle control signal with regard to turning motion performance according to at least one of a phase difference between a yaw rate and lateral acceleration or a lateral slip angle with respect to the riding position, based on the received steering angle. A controller controls the vehicle in accordance with the vehicle control signal. The apparatus provides a passenger of the vehicle with optimal turning motion performance.

18 Claims, 12 Drawing Sheets

(51) Int. Cl.
*B60W 40/105* (2012.01)
*B60W 40/109* (2012.01)
*B60W 40/114* (2012.01)
*B60W 40/13* (2012.01)

(52) U.S. Cl.
CPC .......... *B60W 40/08* (2013.01); *B60W 40/105* (2013.01); *B60W 40/109* (2013.01); *B60W 40/114* (2013.01); *B60W 40/13* (2013.01); B60W 2040/1315 (2013.01); B60W 2420/503 (2013.01); B60W 2520/10 (2013.01); B60W 2520/125 (2013.01); B60W 2520/14 (2013.01); B60W 2520/20 (2013.01); B60W 2520/28 (2013.01); B60W 2540/18 (2013.01); B60W 2540/227 (2020.02)

(58) Field of Classification Search
USPC .......................................................... 701/41
See application file for complete search history.

(56) References Cited

U.S. PATENT DOCUMENTS

| | | | |
|---|---|---|---|
| 8,315,758 B2 | 11/2012 | Takenaka et al. | |
| 2012/0059547 A1* | 3/2012 | Chen | B60W 10/22 701/41 |
| 2012/0109465 A1* | 5/2012 | Svensson | B60T 8/17557 701/42 |
| 2017/0137023 A1* | 5/2017 | Anderson | B60G 17/0195 |
| 2017/0174210 A1* | 6/2017 | Choi | B60W 30/08 |
| 2021/0245732 A1 | 8/2021 | Nahidi et al. | |
| 2022/0242449 A1* | 8/2022 | Sakayori | B60W 40/10 |
| 2023/0077600 A1* | 3/2023 | Hirao | B60N 2/914 297/284.6 |
| 2023/0192068 A1* | 6/2023 | Suh | B60W 10/18 701/23 |

* cited by examiner

VEHICLE MOTION CONTROL APPARATUS AND METHOD THEREOF

CROSS-REFERENCE TO RELATED APPLICATION

The present application claims priority to Korean Patent Application No. 10-2022-0001132, filed on Jan. 4, 2022, the entire contents of which is incorporated herein for all purposes by this reference.

BACKGROUND OF THE PRESENT DISCLOSURE

Field of the Present Disclosure

The present disclosure relates to a vehicle motion control apparatus and a method thereof, and more particularly, relates to an apparatus and a method for controlling motion of a vehicle to improve turning motion performance.

Description of Related Art

With the development of autonomous driving technology capable of performing driving, braking, and steering in behalf of the driver to reduce the fatigue of the driver, the vehicle adds a function as a service providing place as well to a means of transportation to a simple means of transportation. According to such changes in vehicle paradigm, future mobility may drive, while the passenger sits on a seat different from the driver's seat. Thus, the future mobility requires various vehicle controls according to various riding positions.

Meanwhile, an existing vehicle control system performs behavior control optimized at the center of gravity with respect to a vehicle model based on the center of gravity of the vehicle. However, because the vehicle control system is able to provide the user with more suitable turning motion performance when performing behavior control of the vehicle by a vehicle model considering a riding position of the passenger, there is a need to develop such a technology. An autonomous vehicle where the position of the passenger varies more needs vehicle behavior control according to the riding position of the passenger.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus of controlling motion of a vehicle to improve turning motion performance and a method thereof.

Another aspect of the present disclosure provides a vehicle motion control apparatus of providing a passenger of an autonomous vehicle with optimal turning motion performance and a method thereof.

Another aspect of the present disclosure provides a vehicle motion control apparatus of optimizing a lateral slip angle of the vehicle with respect to a riding position and a method thereof.

Another aspect of the present disclosure provides a vehicle motion control apparatus of optimizing a phase difference between a yaw rate and lateral acceleration of a vehicle with respect to a riding position and a method thereof.

Another aspect of the present disclosure provides a vehicle motion control apparatus of improving turning motion performance for future mobility with a high degree of freedom of control and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle motion control apparatus may include a processor provided in a vehicle to determine a riding position of a user, receive information related to a steering angle of the vehicle, and output a vehicle control signal with regard to turning motion performance according to at least one of a phase difference between a yaw rate and lateral acceleration or a lateral slip angle with respect to the riding position, based on the received steering angle and a controller that is configured to control the vehicle in accordance with the vehicle control signal.

In an exemplary embodiment of the present disclosure, exemplary embodiment of the present disclosure, the vehicle motion control apparatus may further include an input device that receives information related to the riding position from the user. The processor is configured to determine the riding position, based on the information related to the riding position, the information being received from the user.

In an exemplary embodiment of the present disclosure, exemplary embodiment of the present disclosure, the vehicle motion control apparatus may further include a seat sensor that detects whether the user sits on a seat of the vehicle. The processor is configured to determine the riding position, according to detecting information of the seat sensor.

In an exemplary embodiment of the present disclosure, exemplary embodiment of the present disclosure, the processor is configured to output the vehicle control signal including at least one of a steering signal, a driving signal, or a braking signal for the vehicle. The controller may perform at least one of steering control, driving control, or braking control of the vehicle in accordance with the vehicle control signal.

In an exemplary embodiment of the present disclosure, exemplary embodiment of the present disclosure, the processor is configured to determine a target behavior of the center of gravity of the vehicle, the target behavior being for minimizing at least one of a phase difference between a yaw rate and lateral acceleration or a lateral slip angle of the riding position.

In an exemplary embodiment of the present disclosure, exemplary embodiment of the present disclosure, the target behavior of the center of gravity may include at least one of a target lateral slip angle, a target lateral slip angular velocity, or a target yaw rate of the center of gravity.

In an exemplary embodiment of the present disclosure, exemplary embodiment of the present disclosure, the processor is configured to determine a target yaw rate of the center of gravity by a steady-state dynamics model, based on the received steering angle.

In an exemplary embodiment of the present disclosure, exemplary embodiment of the present disclosure, the processor is configured to determine at least one of a target lateral slip angle or a target lateral slip angular velocity of the center of gravity, based on the determined target yaw rate, a lateral distance from the center of gravity to the riding position, and a longitudinal distance from the center of gravity to the riding position.

In an exemplary embodiment of the present disclosure, exemplary embodiment of the present disclosure, the processor is configured to determine a front wheel steering angle and a rear wheel steering angle of the vehicle by an inverse dynamics model, based on the lateral slip angle, the target lateral slip angular velocity, and the target yaw rate of the center of gravity.

In an exemplary embodiment of the present disclosure, exemplary embodiment of the present disclosure, the processor is configured to determine a front wheel steering angle of the vehicle, based on the received steering angle, may determine a steering ratio, based on a longitudinal speed of the vehicle and a longitudinal distance from the center of gravity of the vehicle to the riding position, and may determine a rear wheel steering angle of the vehicle, based on the front wheel steering angle and the steering ratio.

In an exemplary embodiment of the present disclosure, exemplary embodiment of the present disclosure, the vehicle motion control apparatus may further include a sensor device that obtains information related to at least one of a wheel speed, longitudinal acceleration, lateral acceleration, a yaw rate, a steering angle, a driving torque, or a braking torque of the vehicle. The processor may feedback the vehicle control signal, based on the target behavior of the center of gravity and the information obtained by the sensor device.

According to an aspect of the present disclosure, a vehicle motion control method may include determining, by a processor provided in a vehicle, a riding position of a user, receiving, by the processor, information related to a steering angle of the vehicle, outputting, by the processor, a vehicle control signal with regard to turning motion performance according to at least one of a phase difference between a yaw rate and lateral acceleration or a lateral slip angle with respect to the riding position, based on the received steering angle, and controlling, by a controller, the vehicle in accordance with the vehicle control signal.

In an exemplary embodiment of the present disclosure, exemplary embodiment of the present disclosure, the vehicle motion control method may further include receiving, by an input device, information related to the riding position from the user. The determining of the riding position of the user by the processor may include determining, by the processor, the riding position, based on the information related to the riding position, the information being received from the user.

In an exemplary embodiment of the present disclosure, exemplary embodiment of the present disclosure, the vehicle motion control method may further include sensing, by a seat sensor provided in the vehicle, whether the user sits on a seat of the vehicle. The determining of the riding position of the user by the processor may include determining, by the processor, the riding position, according to detecting information of the seat sensor.

In an exemplary embodiment of the present disclosure, exemplary embodiment of the present disclosure, the outputting of the vehicle control signal by the processor may include outputting, by the processor, the vehicle control signal including at least one of a steering signal, a driving signal, or a braking signal for the vehicle. The performing of the vehicle control according to the vehicle control signal by the controller may include performing, by the controller, at least one of steering control, driving control, or braking control of the vehicle in accordance with the vehicle control signal.

In an exemplary embodiment of the present disclosure, exemplary embodiment of the present disclosure, the outputting of the vehicle control signal by the processor may include determining, by the processor, a target behavior of the center of gravity of the vehicle, the target behavior being for minimizing at least one of a phase difference between a yaw rate and lateral acceleration or a lateral slip angle of the riding position.

In an exemplary embodiment of the present disclosure, exemplary embodiment of the present disclosure, the determining of the target behavior of the center of gravity of the vehicle by the processor may include determining, by the processor, a target yaw rate of the center of gravity by a steady-state dynamics model, based on the received steering angle and determining, by the processor, at least one of a target lateral slip angle or a target lateral slip angular velocity of the center of gravity, based on the determined target yaw rate, a lateral distance from the center of gravity to the riding position, and a longitudinal distance from the center of gravity to the riding position.

In an exemplary embodiment of the present disclosure, exemplary embodiment of the present disclosure, the outputting of the vehicle control signal by the processor may further include determining, by the processor, a front wheel steering angle and a rear wheel steering angle of the vehicle by an inverse dynamics model, based on the lateral slip angle, the target lateral slip angular velocity, and the target yaw rate of the center of gravity.

In an exemplary embodiment of the present disclosure, exemplary embodiment of the present disclosure, the outputting of the vehicle control signal by the processor may include determining, by the processor, a front wheel steering angle of the vehicle, based on the received steering angle, determining, by the processor, a steering ratio, based on a longitudinal speed of the vehicle and a longitudinal distance from the center of gravity of the vehicle to the riding position, and determining, by the processor, a rear wheel steering angle of the vehicle, based on the front wheel steering angle and the steering ratio.

In an exemplary embodiment of the present disclosure, exemplary embodiment of the present disclosure, the vehicle motion control method may further include obtaining, by a sensor device provided in the vehicle, information related to at least one of a wheel speed, longitudinal acceleration, lateral acceleration, a yaw rate, a steering angle, a driving torque, or a braking torque of the vehicle and feeding back, by the processor, the vehicle control signal, based on the target behavior of the center of gravity and the information obtained by the sensor device.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
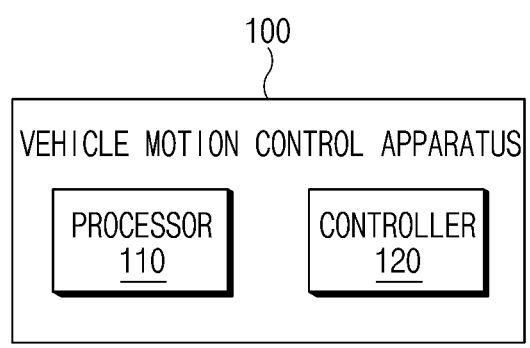
FIG. 1 is a block diagram illustrating a vehicle motion control apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In the drawings, the same reference numerals will be used throughout to designate the same or equivalent elements. Furthermore, a detailed description of well-known features or functions will be ruled out in order not to unnecessarily obscure the gist of the present disclosure.

In describing the components of the exemplary embodiment according to an exemplary embodiment of the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning which is consistent with their meaning in the context of the present disclosure and the relevant art and will not be interpreted in an idealized or overly formal sense unless expressly so defined herein.

Hereinafter, various embodiments of the present disclosure will be described in detail with reference to FIG. 1, FIG. 2, FIG. 3, FIG. 4, FIG. 5, FIG. 6, FIG. 7, FIG. 8, FIG. 9, FIG. 10, FIG. 11 and FIG. 12.

FIG. 1 is a block diagram illustrating a vehicle motion control apparatus according to an exemplary embodiment of the present disclosure.

A vehicle motion control apparatus 100 according to an exemplary embodiment of the present disclosure may be implemented inside or outside a vehicle. In the instant case, the vehicle motion control apparatus 100 may be integrally configured with control units in the vehicle or may be implemented as a separate hardware device to be connected to the control units of the vehicle by a connection means.

As an exemplary embodiment of the present disclosure, the vehicle motion control apparatus 100 may be integrally configured with the vehicle or may be implemented as a separate configuration independent of the vehicle in a form of being installed/attached to the vehicle. Alternatively, a part of the vehicle motion control apparatus 100 may be integrally configured with the vehicle and the other may be implemented as a separate configuration independent of the vehicle in a form of being installed/attached to the vehicle.

Referring to FIG. 1, the vehicle motion control apparatus 100 may include a processor 110 and a controller 120.

The processor 110 may be electrically connected to the controller 120, an input device, a seat sensor, a sensor device, or the like and may electrically control the respective components. The processor 110 may be an electrical circuit which executes instructions of software and may perform a variety of data processing and determination described below. The processor 110 may be, for example, an electronic control unit (ECU), a micro controller unit (MCU), or another sub-controller, which is loaded into the vehicle.

The processor 110 may be provided in the vehicle to determine a riding position of a user.

As an exemplary embodiment of the present disclosure, the processor 110 may determine a riding position based on information related to the riding position, which is received from the user.

Although not illustrated, the vehicle motion control apparatus 100 may further include an input device which receives information related to a riding position from the user.

As an exemplary embodiment of the present disclosure, the input device may include an input button. The input button may be implemented by a push button, a button implemented by a touch screen, or the like.

As an exemplary embodiment of the present disclosure, the input device may include an input button configured for causing the user to directly select a riding position, an input button causing the processor 110 to automatically detect a riding position, and/or an input button causing the processor 110 to regard a riding position as a predetermined default riding position.

The input device may be connected to the processor 110 through wireless or wired communication to directly or indirectly deliver input information to the processor 110.

As an exemplary embodiment of the present disclosure, the processor 110 may determine a riding position, based on sensing information of a seat sensor.

When a signal causing the processor 110 to automatically detect a riding position is received from the input device, the processor 110 may determine the riding position, based on the detecting information of the seat sensor.

Although not illustrated, the vehicle motion control apparatus 100 may further include the seat sensor which detects whether the user sits on a seat of the vehicle.

As an exemplary embodiment of the present disclosure, the seat sensor may be provided in each seat of the vehicle to determine whether the user sits on each seat.

The seat sensor may be connected to the processor 110 through wireless or wired communication to directly or indirectly deliver input information to the processor 110.

The processor 110 may receive information related to a steering angle of the vehicle.

As an exemplary embodiment of the present disclosure, the processor 110 may obtain steering control information directly input by a driver or steering information determined by an autonomous driving system.

As an exemplary embodiment of the present disclosure, the processor 110 may be connected to a steering wheel or a steering system of the vehicle to obtain steering control information directly input by the driver from the steering wheel or the steering system of the vehicle.

As an exemplary embodiment of the present disclosure, the processor 110 may be connected to the autonomous driving system to obtain steering information determined from the autonomous driving system.

The processor 110 may output a vehicle control signal with regard to turning motion performance according to at least one of a phase difference between a yaw rate and lateral acceleration or a lateral slip angle with respect to the riding position, based on the input steering angle.

As an exemplary embodiment of the present disclosure, the processor 110 may deliver the output vehicle control signal to the controller 120.

As an exemplary embodiment of the present disclosure, the processor 110 may output the vehicle control signal including at least one of a steering signal, a driving signal, or a braking signal for the vehicle.

As an exemplary embodiment of the present disclosure, the steering signal may include information related to a target steering angle of the vehicle.

As an exemplary embodiment of the present disclosure, the driving signal may include information related to a target driving force or a target driving torque of the vehicle.

As an exemplary embodiment of the present disclosure, the braking signal may include information related to a target braking force or a target braking torque of the vehicle.

As an exemplary embodiment of the present disclosure, the processor 110 may determine a target behavior of the center of gravity of the vehicle, which is for minimizing at least one of a phase difference between a yaw rate and lateral acceleration or a lateral slip angle of the riding position.

When at least one of the phase difference between a yaw rate and lateral acceleration or the lateral slip angle of the riding position is minimized, turning motion performance of the vehicle may be improved with respect to the riding position.

As an exemplary embodiment of the present disclosure, the target behavior of the center of gravity may include at least one of a target lateral slip angle, a target lateral slip angular velocity, or a target yaw rate of the center of gravity.

As an exemplary embodiment of the present disclosure, the processor 110 may determine a target behavior of the center of gravity of the vehicle where the lateral slip angle of the riding position is "0".

As an exemplary embodiment of the present disclosure, the processor 110 may determine the target behavior of the center of gravity of the vehicle where the lateral slip angle of the riding position is "0", by a relationship between a lateral slip angle with respect to the riding position and a lateral slip angle with respect to the center of gravity.

As an exemplary embodiment of the present disclosure, the processor 110 may determine a yaw rate with respect to the center of gravity of the vehicle by a reference model and may determine a target lateral slip angle and a target lateral slip angular velocity of the center of gravity of the vehicle, which are for minimizing at least one of a phase difference between a yaw rate and lateral acceleration or a lateral slip angle of the riding position, using the determined yaw rate.

As an exemplary embodiment of the present disclosure, the processor 110 may determine a target yaw rate of the center of gravity by a steady-state dynamics model, based on the input steering angle.

As an exemplary embodiment of the present disclosure, the processor 110 may determine a target yaw rate of the center of gravity, using a simplified steady-state bicycle model.

As an exemplary embodiment of the present disclosure, the processor 110 may determine at least one of a target lateral slip angle or a target lateral slip angular velocity of the center of gravity, based on the determined target yaw rate, a lateral distance from the center of gravity to the riding position, and a longitudinal distance from the center of gravity to the riding position.

A description will be provided in detail below of detailed contents where the processor 110 determines at least one of the target lateral slip angle, the target lateral slip angular velocity, or the target yaw rate of the center of gravity with reference to FIG. 4.

As an exemplary embodiment of the present disclosure, the processor 110 may determine a front wheel steering angle and a rear wheel steering angle of the vehicle, by an inverse dynamics model, based on the lateral slip angle, the target lateral slip angular velocity, and the target yaw rate of the center of gravity.

As an exemplary embodiment of the present disclosure, the processor 110 may determine a front wheel steering angle of the vehicle, based on the input steering angle, may determine a steering ratio, based on a lateral speed of the vehicle and a lateral distance from the center of gravity of the vehicle to the riding position, and may determine a rear wheel steering angle of the vehicle, based on the front wheel steering angle and the steering ratio.

A description will be provided in detail below of detailed contents where the processor 110 determines the front wheel steering angle and the rear wheel steering angle of the vehicle with reference to FIGS. 7 and 8.

As an exemplary embodiment of the present disclosure, the processor 110 may determine at least one of a steering angle, a driving torque, or a braking torque of the vehicle, which corresponds to the determined target behavior for the center of gravity.

As an exemplary embodiment of the present disclosure, the processor 110 may determine at least one of a front wheel steering angle, a rear wheel steering angle, a front wheel driving torque, a rear wheel driving torque, a front wheel braking torque, or a rear wheel braking torque of a four-wheel drive vehicle.

Herein, because the driving torque/braking torque of the vehicle and the driving force/braking force of the vehicle are the concept of one to one correspondence with each other, it is obvious that determining the driving torque/braking torque at the processor 110 is the same as determining the driving force/braking force at the processor 110.

As an exemplary embodiment of the present disclosure, the processor 110 may determine at least one of a steering angle, a driving torque, or a braking torque of the vehicle, based on the target lateral slip angle, the target lateral slip angular velocity, and the target yaw rate for the center of gravity, by an inverse dynamics model based on a bicycle model which simplifies lateral motion of the vehicle.

Although not illustrated, the vehicle motion control apparatus 100 may further include a sensor device which obtains information related to at least one of a wheel speed, longitudinal acceleration, lateral acceleration, a yaw rate, a steering angle, a driving torque, or a braking torque of the vehicle.

As an exemplary embodiment of the present disclosure, the sensor device may include at least one sensor which obtains information related to at least one of a wheel speed, longitudinal acceleration, lateral acceleration, a yaw rate, a front wheel steering angle, a rear wheel steering angle, a front wheel driving torque, a rear wheel driving torque, a front wheel braking torque, or a rear wheel braking torque of the vehicle.

As an exemplary embodiment of the present disclosure, the sensor device may obtain and deliver information related to an actual behavior of the vehicle to the processor 110 in real time.

As an exemplary embodiment of the present disclosure, the processor 110 may feed back at least one of a steering angle, a driving torque, or a braking torque, based on the target behavior for the center of gravity and the information obtained by the sensor device.

As an exemplary embodiment of the present disclosure, the processor 110 may feed back at least one of a steering angle, a driving torque, or a braking torque, based on a difference between a target steering angle, a target driving torque, or a target braking torque and a steering angle, a driving torque, or a braking torque of a real vehicle, which is measured in real time.

As an exemplary embodiment of the present disclosure, the processor 110 may reflect a difference between a target value and the detected actual value to correct a target steering angle, a target driving torque, or a target braking torque.

The controller 120 may control a behavior of the vehicle. Such a controller 120 may be implemented in a form of hardware, may be implemented in a form of software, or may be implemented in a form of a combination thereof. The controller 120 may be implemented as, but not limited to, a microprocessor. Furthermore, the controller 120 may perform a variety of data processing, determination, and the like, which will be described below, for vehicle behavior control.

The controller 120 may control the vehicle in accordance with a vehicle control signal.

As an exemplary embodiment of the present disclosure, the controller 120 may perform at least one of steering control, driving control, or braking control of the vehicle, in accordance in accordance with the vehicle control signal.

As an exemplary embodiment of the present disclosure, the controller 120 may include a steering control device, a driving control device, and/or a braking control device of the vehicle.

As an exemplary embodiment of the present disclosure, the controller 120 may control at least one of a front wheel steering angle, a rear wheel steering angle, a front wheel driving torque, a rear wheel driving torque, a front wheel braking torque, or a rear wheel braking torque of the four-wheel drive vehicle, based on an amount of target control determined from the processor 110.

Figure 2:
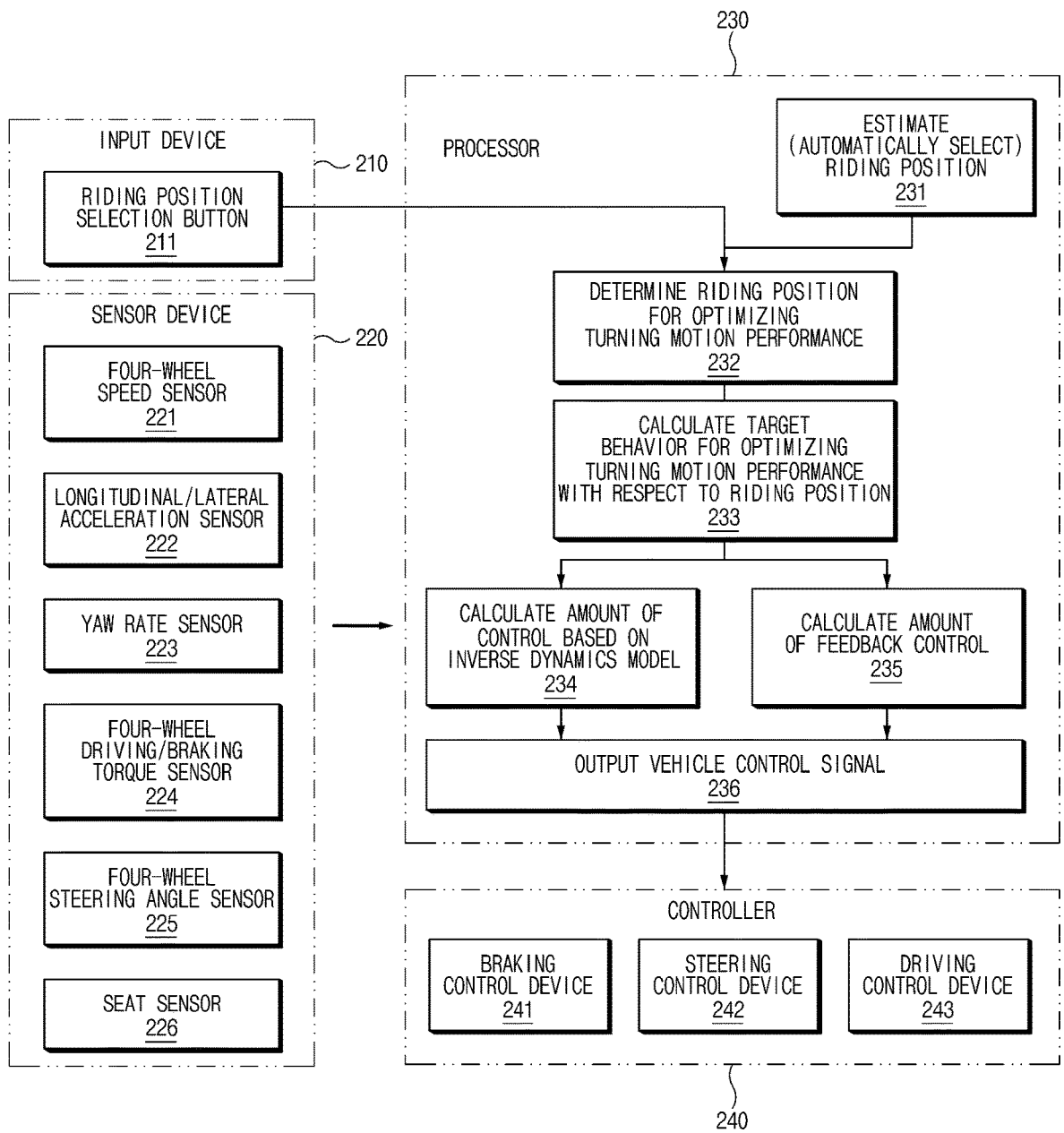
FIG. 2 is a block diagram illustrating a detailed configuration of a vehicle motion control apparatus according to an exemplary embodiment of the present disclosure.

FIG. 2 is a block diagram illustrating a detailed configuration of a vehicle motion control apparatus according to an exemplary embodiment of the present disclosure.

Referring to FIG. 2, an input device 210 may include a riding position selection button 211.

As an exemplary embodiment of the present disclosure, the input device 210 may receive a signal for a riding position from a user, by the riding position selection button 211.

The user may directly select a riding position by the riding position selection button 211 or may allow a riding position to be automatically selected.

The input device 210 is exemplified as a button, but may be implemented to receive information related to a riding position from the user by a user interface (UI) or the like through a touch screen or the like.

A sensor device 220 may include a four-wheel speed sensor 221, a longitudinal/lateral acceleration sensor 222, a yaw rate sensor 223, a four-wheel driving/braking torque sensor 224, a four-wheel steering angle sensor 225, and a seat sensor 226.

As an exemplary embodiment of the present disclosure, the sensor device 220 may detect a front wheel speed and a rear wheel speed in real time, by the four-wheel speed sensor 221.

As an exemplary embodiment of the present disclosure, the sensor device 220 may detect longitudinal acceleration and lateral acceleration of the vehicle in real time by the longitudinal/lateral acceleration sensor 222.

As an exemplary embodiment of the present disclosure, the sensor device 220 may detect a yaw rate of the vehicle in real time by the yaw rate sensor 223.

As an exemplary embodiment of the present disclosure, the sensor device 220 may detect a front wheel driving torque, a rear wheel driving torque, a front wheel braking torque, and a rear wheel braking torque of the vehicle in real time by the four-wheel driving/braking torque sensor 224.

As an exemplary embodiment of the present disclosure, the sensor device 220 may detect a front wheel steering angle and a rear wheel steering angle of the vehicle in real time by the four-wheel steering angle sensor 225.

As an exemplary embodiment of the present disclosure, the sensor device 220 may detect whether the user sits on each seat of the vehicle by the seat sensor 226.

As an exemplary embodiment of the present disclosure, the sensor device 220 may deliver the detected information to the processor 230.

The processor 230 may estimate (automatically select) a riding position (refer to reference numeral 231).

As an exemplary embodiment of the present disclosure, when a signal for automatically selecting a riding position is input through the riding position selection button 211, the processor 230 may estimate the riding position.

As an exemplary embodiment of the present disclosure, the processor 230 may select a riding position, based on sitting information detected by the seat sensor 226.

The processor 230 may determine a riding position for optimizing turning motion performance (refer to reference numeral 232), based on information input by the riding position selection button 211 and/or information obtained by estimating a riding position.

The riding position for optimizing the turning motion may refer to a position which becomes a criterion to optimize turning motion performance and may be determined as a riding position.

The processor 230 may determine a target behavior for optimizing turning motion performance with respect to the riding position (refer to reference numeral 233).

As an exemplary embodiment of the present disclosure, the processor 230 may determine a target behavior of the riding position, which is for optimizing turning motion performance with respect to the riding position, and may determine a target behavior of the center of gravity of the vehicle, which corresponds to the determined target behavior of the riding position.

The processor 230 may determine an amount of target control of the vehicle using an inverse dynamics model, based on the determined target behavior (refer to reference numeral 234).

The processor 230 may determine an amount of feedback control, based on the determined target behavior and vehicle behavior information detected in real time (refer to reference numeral 235).

The processor 230 may output a vehicle control signal, based on the determined amount of control based on the inverse dynamics model and the determined amount of feedback control.

As an exemplary embodiment of the present disclosure, the processor 230 may reflect the amount of target control determined using the inverse dynamics model in a form of feed forward to output a vehicle control signal in which the amount of feedback control is reflected in a form of feedback.

The controller 240 may include a braking control device 241, a steering control device 242, and a driving control device 243.

The controller 240 may perform front wheel braking control and rear wheel braking control of the vehicle by the braking control device 241, based on the vehicle control signal.

The controller 240 may perform front wheel steering control and rear wheel steering control of the vehicle by the steering control device 242, based on the vehicle control signal.

The controller 240 may perform front wheel driving control and rear wheel driving control of the vehicle by the driving control device 243, based on the vehicle control signal.

Figure 3:
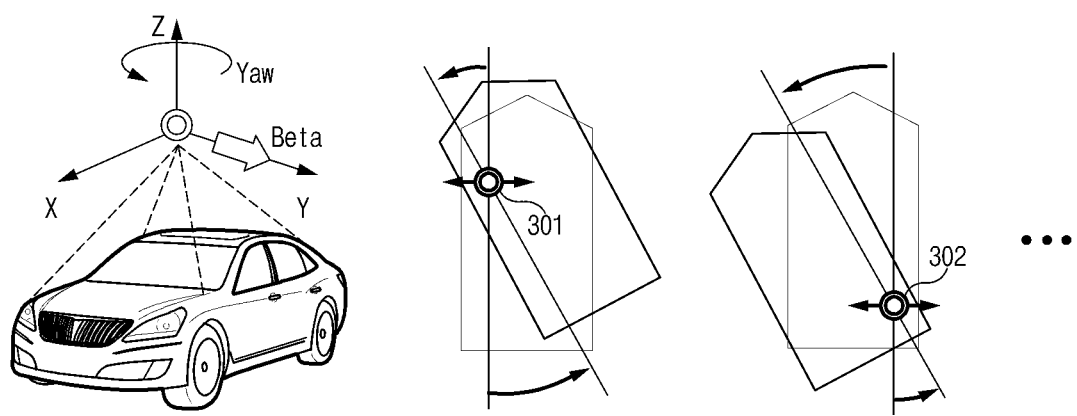
FIG. 3 is a drawing illustrating that a vehicle motion control apparatus is configured to control a vehicle with respect to a riding position according to an exemplary embodiment of the present disclosure.

FIG. 3 is a drawing illustrating that a vehicle motion control apparatus is configured to control a vehicle with respect to a riding position according to an exemplary embodiment of the present disclosure.

Referring to FIG. 3, a position 301 or 302 of a passenger may be changed for each driving of a vehicle.

A phase difference between a yaw rate and lateral acceleration or a lateral slip angle with respect to the passenger position may vary with the position 301 or 302 of the passenger.

Thus, a vehicle motion control apparatus 100 of FIG. 1 may determine a target lateral slip angle (Beta), a target lateral slip angular velocity, and/or a target yaw rate of the position 301 or 302 of the passenger, which are/is for minimizing a phase difference between a yaw rate and lateral acceleration or a lateral slip angle according to the position 301 or 302 of the passenger.

The vehicle motion control apparatus 100 may automatically detect the position 301 or 302 of the passenger or may receive information related to a riding position directly selected from a user.

The vehicle motion control apparatus 100 may determine an amount of control for driving, braking, and steering of the vehicle, based on the determined target lateral slip angle, the determined target lateral slip angular velocity, and/or the determined target yaw rate of the position 301 or 302 of the passenger, and may perform vehicle control in accordance with the determined amount of control.

Figure 4:
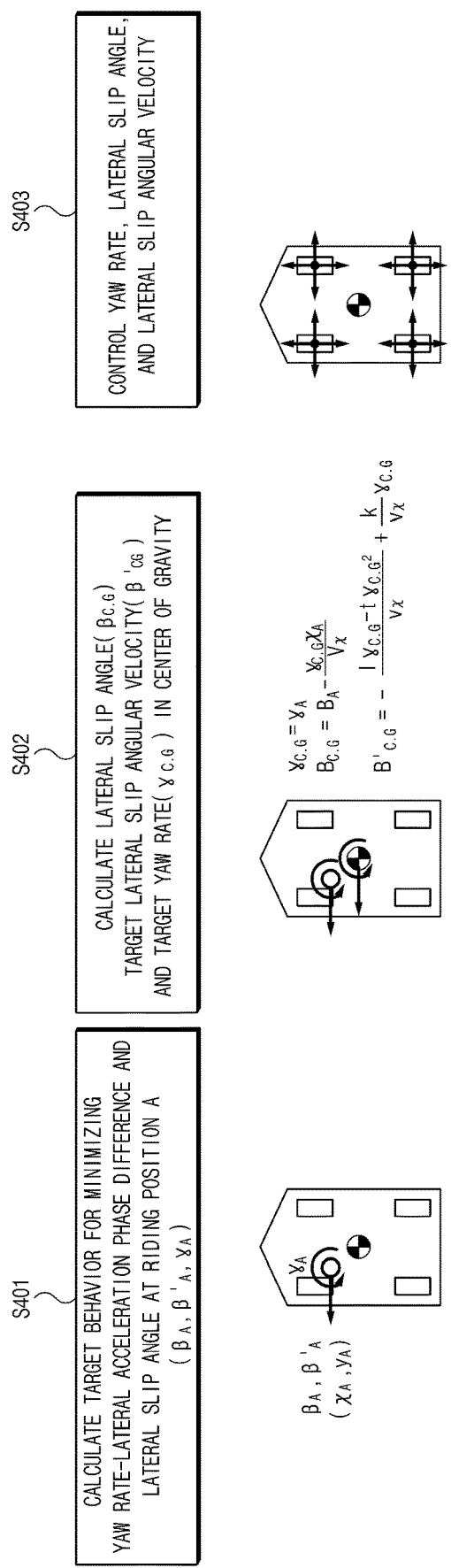
FIG. 4 is a drawing illustrating a process where a vehicle motion control apparatus is configured to control a yaw rate, a lateral slip angle, and a lateral slip angular velocity of a vehicle according to an exemplary embodiment of the present disclosure.

FIG. 4 is a drawing illustrating a process where a vehicle motion control apparatus is configured to control a yaw rate, a lateral slip angle, and a lateral slip angular velocity of a vehicle according to an exemplary embodiment of the present disclosure.

Referring to FIG. 4, in S401, a vehicle motion control apparatus 100 of FIG. 1 may determine a target behavior for minimizing a yaw rate-lateral acceleration phase difference and a lateral slip angle at a riding position A.

As an exemplary embodiment of the present disclosure, the vehicle motion control apparatus 100 may determine a target lateral slip angle $\beta\_A$, a target lateral slip angular velocity $\beta'\_A$, and a target yaw rate $\gamma\_A$ with respect to the riding position A, which are for minimizing the yaw rate-lateral acceleration phase difference and the lateral slip angle at the riding position A.

In S402, the vehicle motion control apparatus 100 may determine a target lateral slip angle $\beta\_C.G$, a target lateral slip angular velocity $\beta'\_C.G$, and a target yaw rate $\gamma\_C.G$ in the center of gravity C.G.

As an exemplary embodiment of the present disclosure, the vehicle motion control apparatus 100 may determine the target lateral slip angle $\beta\_C.G$ and the target yaw rate $\gamma\_C.G$ in the center of gravity C.G, based on the determined lateral slip angle and the determined yaw rate with respect to the riding position A.

The vehicle motion control apparatus 100 may determine the target lateral slip angle $\beta\_C.G$ and the target yaw rate $\gamma\_C.G$ in the center of gravity C.G, by Equation 1 below.

$$\gamma_{C.G} = \gamma_A$$
$$\beta_{C.G} = \beta_A - \frac{\gamma_{C.G} x_A}{v_x}$$
$$\dot{\beta}_{CG} = -\frac{l\gamma_{C.G} - t\gamma_{C.G}^2}{v_x} + \frac{k}{v_x}\gamma_{C.G}$$

[Equation 1]

Herein, $\gamma\_C.G$ may refer to the target yaw rate in the center of gravity C.G, and $\gamma\_A$ may refer to the target yaw rate at the riding position A.

Furthermore, in Equation 1 above, $\beta\_C.G$ may refer to the target lateral slip angle in the center of gravity C.G, $\beta\_A$ may refer to the target lateral slip angle at the riding position A, v_x may refer to the longitudinal speed of the vehicle, and x_A may refer to the longitudinal distance from the center of gravity C.G to the riding position A.

Furthermore, in Equation 1 above, B'_C.G may refer to the target lateral slip angular velocity in the center of gravity C.G, I may be the longitudinal distance from the center of gravity C.G to the riding position A, which may refer to the same value as x_A, $\gamma\_C.G$ may refer to the differential value of the target yaw rate in the center of gravity C.G of the vehicle, t may refer to the lateral distance from the center of gravity C.G to the riding position A, and k may refer to the control gain.

In S403, the vehicle motion control apparatus 100 may control a yaw rate, a lateral slip angle, and a lateral slip angular velocity of the vehicle.

As an exemplary embodiment of the present disclosure, the vehicle motion control apparatus 100 may control the yaw rate, the lateral slip angle, and the lateral slip angular velocity of the vehicle, based on the determined target lateral slip angle $\beta\_C.G$, the determined target lateral slip angular velocity $\beta'\_C.G$, and the determined target yaw rate $\gamma\_C.G$ in the center of gravity C.G.

As an exemplary embodiment of the present disclosure, the vehicle motion control apparatus 100 may control the yaw rate, the lateral slip angle, and the lateral slip angular velocity of the vehicle by driving control, braking control, and steering control of the vehicle.

Figure 5:
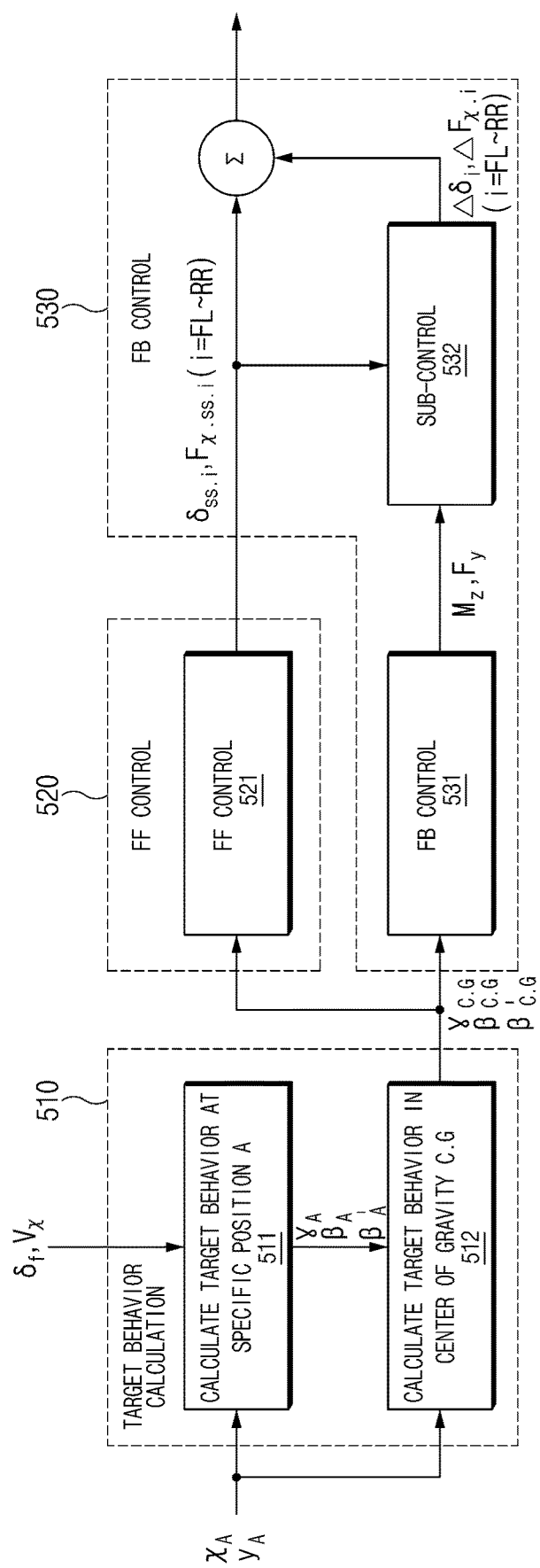
FIG. 5 is a drawing illustrating that a vehicle motion control apparatus is configured to control a behavior of a vehicle according to an exemplary embodiment of the present disclosure.

FIG. 5 is a drawing illustrating that a vehicle motion control apparatus is configured to control a behavior of a vehicle according to an exemplary embodiment of the present disclosure.

Referring to FIG. 5, a vehicle motion control apparatus 100 of FIG. 1 may perform target behavior determination 510, feed forward (FF) control 520, and feedback (FB) control 530.

The vehicle motion control apparatus 100 may determine a target behavior at a specific position A of the vehicle (refer to reference numeral 511), based on a front wheel steering angle $\delta\_f$ of the vehicle, a longitudinal speed V_x of the vehicle, a longitudinal distance x_A from the center of gravity of the vehicle to the specific position A, and a lateral distance y_A from the center of gravity of the vehicle to the specific position A.

As an exemplary embodiment of the present disclosure, the vehicle motion control apparatus 100 may determine a target behavior including a target lateral slip angle $\beta\_A$, a target lateral slip angular velocity $\beta'\_A$, and a target yaw rate $\gamma\_A$ at the specific position A of the vehicle.

The vehicle motion control apparatus 100 may determine a target behavior in the center of gravity C.G of the vehicle (refer to reference numeral 512), based on the target lateral slip angle $\beta\_A$, the target lateral slip angular velocity $\beta'\_A$, and the target yaw rate $\gamma\_A$ at the specific position A of the vehicle, the longitudinal distance x_A from the center of gravity of the vehicle to the specific position A, and the lateral distance y_A from the center of gravity of the vehicle to the specific position A.

As an exemplary embodiment of the present disclosure, the vehicle motion control apparatus 100 may determine a target behavior including a target lateral slip angle $\beta\_C.G$, a target lateral slip angular velocity $\beta\_C.G$, and a target yaw rate $\gamma\_C.G$ in the center of gravity C.G of the vehicle.

The vehicle motion control apparatus 100 may determine a default amount of control $\delta\_ss,i$ for a steering angle of the vehicle and a default amount of control $F\_x,ss,i$ for a braking/driving force of the vehicle, based on the target lateral slip angle $\beta\_C.G$, the target lateral slip angular velocity $\beta\_C.G$, and the target yaw rate $\gamma\_C.G$ in the center of gravity C.G of the vehicle and may perform FF-based vehicle control (refer to reference numeral 521).

As an exemplary embodiment of the present disclosure, the vehicle motion control apparatus 100 may determine a default amount of control $\delta\_ss,i$ for a steering angle of the vehicle and a default amount of control $F\_x,ss,i$ for a braking/driving force of the vehicle, which correspond to each of four wheels of the vehicle.

The vehicle motion control apparatus 100 may determine an amount of feedback control, based on the target lateral slip angle $\beta\_C.G$, the target lateral slip angular velocity $\beta\_C.G$, and the target yaw rate $\gamma\_C.G$ in the center of gravity C.G of the vehicle and may perform FB-based vehicle control (refer to reference numeral 531).

As an exemplary embodiment of the present disclosure, the vehicle motion control apparatus 100 may determine an amount of feedback control including a control yaw moment M_z and a lateral force F_y, by a proportional-integral-differential (PID) controller.

The vehicle motion control apparatus 100 may determine an amount of steering angle correction $\Delta\delta\_i$ and an amount of longitudinal braking/driving force correction $\Delta F\_x,i$ of the vehicle, which correspond to each of the four wheels of the vehicle, based on the default amount of control $\delta\_ss,i$ for the steering angle of the vehicle, the default amount of control $F\_x,ss,i$ for the braking/driving force of the vehicle, the control yaw moment M_z, and the lateral force F_y, and may perform feedback sub-control (refer to reference numeral 532), which correspond to each of the four wheels of the vehicle.

The vehicle motion control apparatus 100 may add the determined default amount of control $\delta\_ss,i$ for the steering angle of the vehicle and the determined amount of steering angle correction $\Delta\delta\_i$, to correspond to each of the four wheels of the vehicle, to determine a final amount of steering angle control.

The vehicle motion control apparatus 100 may add the determined default amount of control $F\_x,ss,i$ for the braking/driving force of the vehicle and the determined amount of braking/driving force correction $\Delta F\_x,i$, to correspond to each of the four wheels of the vehicle, to determine a final amount of braking/driving force control.

Figure 6:
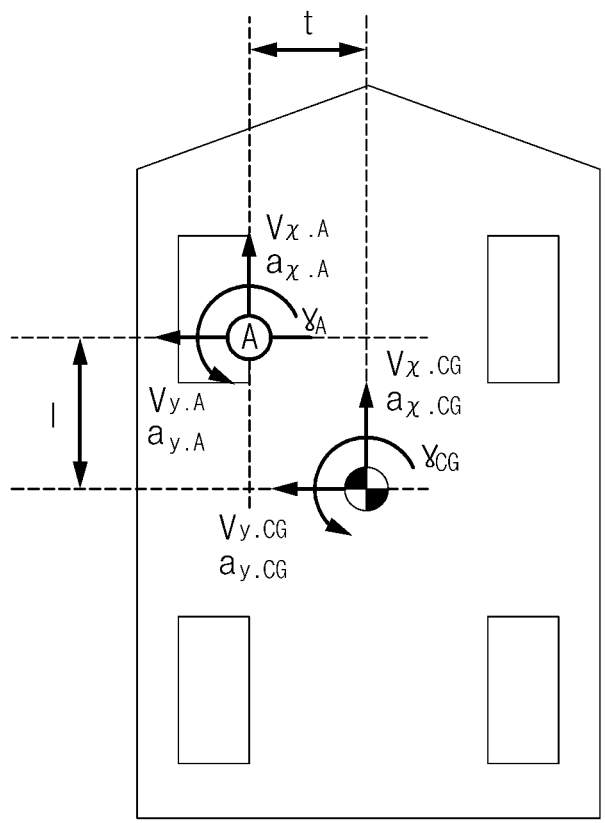
FIG. 6 is a drawing illustrating a vehicle model used by a vehicle motion control apparatus according to an exemplary embodiment of the present disclosure.

FIG. 6 is a drawing illustrating a vehicle model used by a vehicle motion control apparatus according to an exemplary embodiment of the present disclosure.

A vehicle motion control apparatus 100 of FIG. 1 may determine a target lateral slip angle of the center of gravity C.G of the vehicle, which renders a lateral slip angle with respect to the riding position A "0", using the vehicle model.

The target lateral slip angle of the center of gravity C.G of the vehicle, which renders the lateral slip angle with respect to the riding position A "0" may be determined as Equation 2 below.

$$\beta_{CG,tar} = -\frac{\gamma \cdot l}{v_{x,A}} \qquad \text{[Equation 2]}$$

Herein, β_CG.tar may refer to the target lateral slip angle of the center of gravity, γ may refer to the yaw rate of the vehicle, I may refer to the longitudinal distance from the center of gravity of the vehicle to the riding position A, and v_x.A may refer to the longitudinal speed of the vehicle at the specific position A.

Furthermore, the vehicle motion control apparatus 100 may determine a target lateral slip angle of the center of gravity C. G of the vehicle, which is for minimizing a yaw rate-lateral acceleration phase difference with respect to the riding position A, using the vehicle model.

The vehicle motion control apparatus 100 may use Equation 3 about lateral acceleration in a process of determining the target lateral slip angular velocity of the center of gravity C. G of the vehicle.

$$a_{y.A} = V_{x.CG}\gamma + \dot{V}_{y.CG} + l\dot{\gamma} - t\gamma^2$$

$$(\dot{V}_{y.CG} + l\dot{\gamma} - t\gamma^2 - k\gamma) \quad \text{[Equation 3]}$$

Herein, a_y.A may refer to the lateral acceleration with respect to the riding position A, V_x.CG may refer to the longitudinal speed of the vehicle in the center of gravity, y may refer to the yaw rate of the vehicle, V'_y.CG may refer to the lateral acceleration of the vehicle in the center of gravity, I may refer to the longitudinal distance from the center of gravity of the vehicle to the riding position A, t may refer to the lateral distance from the center of gravity of the vehicle to the riding position A, and γ' may refer to the differential value of the yaw rate of the vehicle.

The V'_y.CG+1*γ'-t*γ^2 portion may be terms corresponding to a factor where the yaw rate-lateral acceleration phase difference occurs, which may be represented using a control gain k.

As an exemplary embodiment of the present disclosure, the target lateral slip angle in the center of gravity of the vehicle, which is for minimizing the yaw rate-lateral acceleration phase difference with respect to the riding position A may be determined as Equation 4 below.

$$\dot{\beta}_{CG.tar} = -\frac{l\dot{\gamma} - t\gamma^2}{v_x} + \frac{k}{v_x}\gamma \quad \text{[Equation 4]}$$

Herein, β'_CG.tar may refer to the target lateral slip angular velocity of the center of gravity, v_x may refer to the longitudinal speed of the vehicle, and k may refer to the control gain.

The vehicle motion control apparatus 100 may determine a target lateral slip angle and a target lateral slip angular velocity in the center of gravity by Equations 2 and 4 above.

Furthermore, the vehicle motion control apparatus 100 may determine a target yaw rate of the vehicle in the center of gravity, based on the input steering angle, by a previously used reference model.

The vehicle motion control apparatus 100 may determine a lateral slip angle, a lateral slip angular velocity, and a yaw rate in the center of gravity, which are for minimizing the yaw rate-lateral acceleration phase difference and/or the lateral slip angle with respect to the riding position A, using Equations 2 and 4 above.

Figure 7:
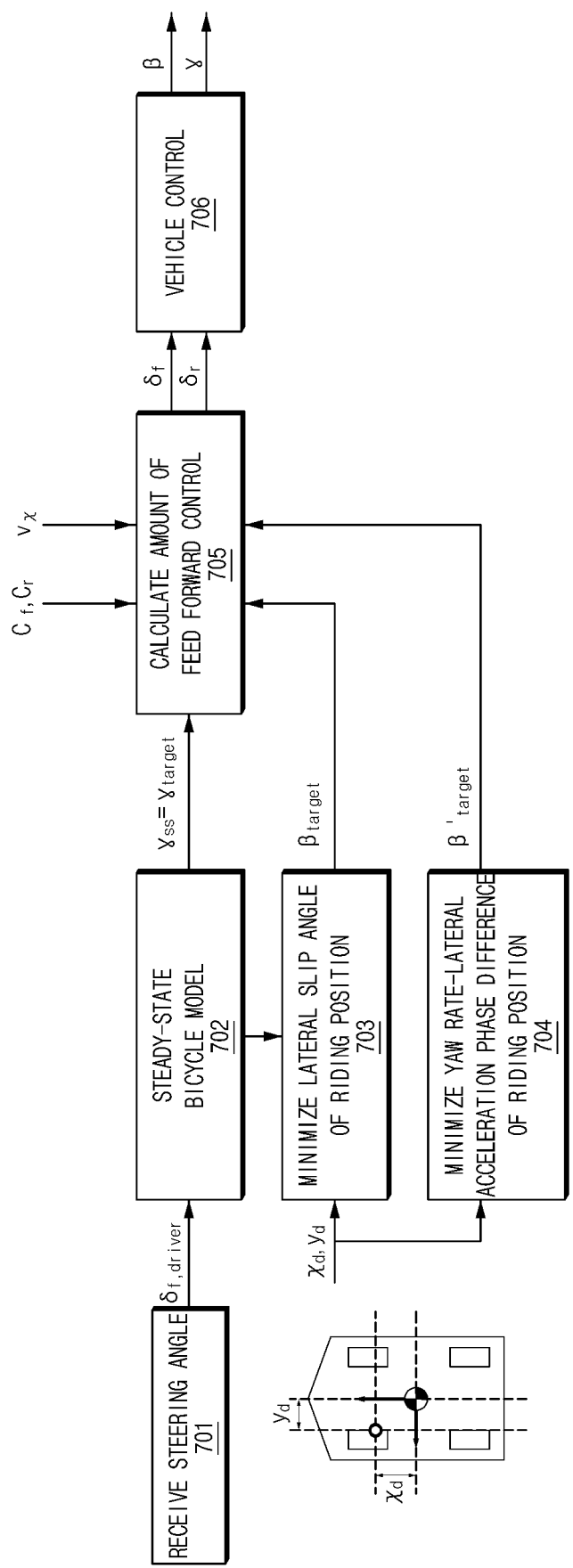
FIG. 7 is a drawing illustrating that a vehicle motion control apparatus is configured to perform feed forward control according to an exemplary embodiment of the present disclosure.

FIG. 7 is a drawing illustrating that a vehicle motion control apparatus is configured to perform feed forward control according to an exemplary embodiment of the present disclosure.

Referring to FIG. 7, in 701, a vehicle motion control apparatus 100 of FIG. 1 may receive a steering angle.

As an exemplary embodiment of the present disclosure, the vehicle motion control apparatus 100 may receive a steering angle based on steering control information directly input by a driver or steering information determined by an autonomous driving system.

In 702, the vehicle motion control apparatus 100 may determine a target yaw rate γ_target by a steady-state bicycle model, based on the received steering angle δ_f,driver.

As an exemplary embodiment of the present disclosure, the vehicle motion control apparatus 100 may determine a steady-state yaw rate γ_ss as the target yaw rate γ_target by the bicycle model.

In 703, the vehicle motion control apparatus 100 may determine a target lateral slip angle β_target in the center of gravity, which is for minimizing a lateral slip angle of the riding position, based on a longitudinal distance x_d from the center of gravity to the riding position, a lateral distance y_d from the center of gravity to the riding position, and a target yaw rate γ_target.

As an exemplary embodiment of the present disclosure, the vehicle motion control apparatus 100 may determine the target lateral slip angle β_target in the center of gravity by Equation 5 below.

$$\beta_{target} = -\frac{\gamma_{target} x_d}{v_x - \gamma_{target} y_d} \quad \text{[Equation 5]}$$

Herein, v_x may refer to the longitudinal speed of the vehicle.

In 704, the vehicle motion control apparatus 100 may determine a target lateral slip angular velocity β'_target in the center of gravity, which is for minimizing a yaw rate-lateral acceleration phase difference of the riding position, based on the longitudinal distance x_d from the center of gravity to the riding position, the lateral distance y_d from the center of gravity to the riding position, and the target yaw rate γ_target.

As an exemplary embodiment of the present disclosure, the vehicle motion control apparatus 100 may determine the target lateral slip angular velocity β'_target in the center of gravity by Equation 6 below.

$$\dot{\beta}_{target} = -\frac{l\dot{\gamma}_{target} - t\gamma^2_{target}}{v_x} + \frac{k}{v_x}\gamma_{target} \quad \text{[Equation 6]}$$

Herein, I may refer to the longitudinal distance from the center of gravity to the riding position, and k may refer to the control gain.

In 705, the vehicle motion control apparatus 100 may determine an amount of feed forward control, based on the target lateral slip angle β_target, the target lateral slip angular velocity β'_target, and the target yaw rate γ_target.

As an exemplary embodiment of the present disclosure, the amount of feed forward control may include an amount of control for a front wheel steering angle δ_f and a rear wheel steering angle δ_r.

As an exemplary embodiment of the present disclosure, the vehicle motion control apparatus 100 may determine the front wheel steering angle δ_f and the rear wheel steering angle δ_r by Equation 7 below.

$$\delta_f = \frac{l_r m v_x}{C_f L}\dot{\beta}_{tar} + \beta_{tar} + \frac{I_z}{C_f L}\dot{\gamma}_{tar} + \frac{C_f l_f L + l_r m v_x^2}{C_f L v_x}\gamma_{tar} \quad \text{[Equation 7]}$$

-continued $$\delta_r = \frac{l_f m v_x}{C_r L}\beta_{tar} + \beta_{tar} - \frac{I_z}{C_r L}\gamma_{tar} + \frac{-C_r l_r L + l_f m v_x^2}{C_r L v_x}\gamma_{tar}$$

Herein, each of C_f and C_r may refer to the cornering stiffness of each of the front wheel and the rear wheel, I_z may refer to the yaw moment of inertia, each of l_f and l_r may refer to the distance from the center of gravity to each of the front wheel and the rear wheel, and L may refer to the distance between the front wheel axle and the rear wheel axle.

Furthermore, it may be understood that β_target and β_tar are the same as each other. It may be understood that γ_target and γ_tar are the same as each other.

In 706, the vehicle motion control apparatus 100 may perform vehicle control, based on the front wheel steering angle δ_f and the rear wheel steering angle δ_r.

Figure 8:
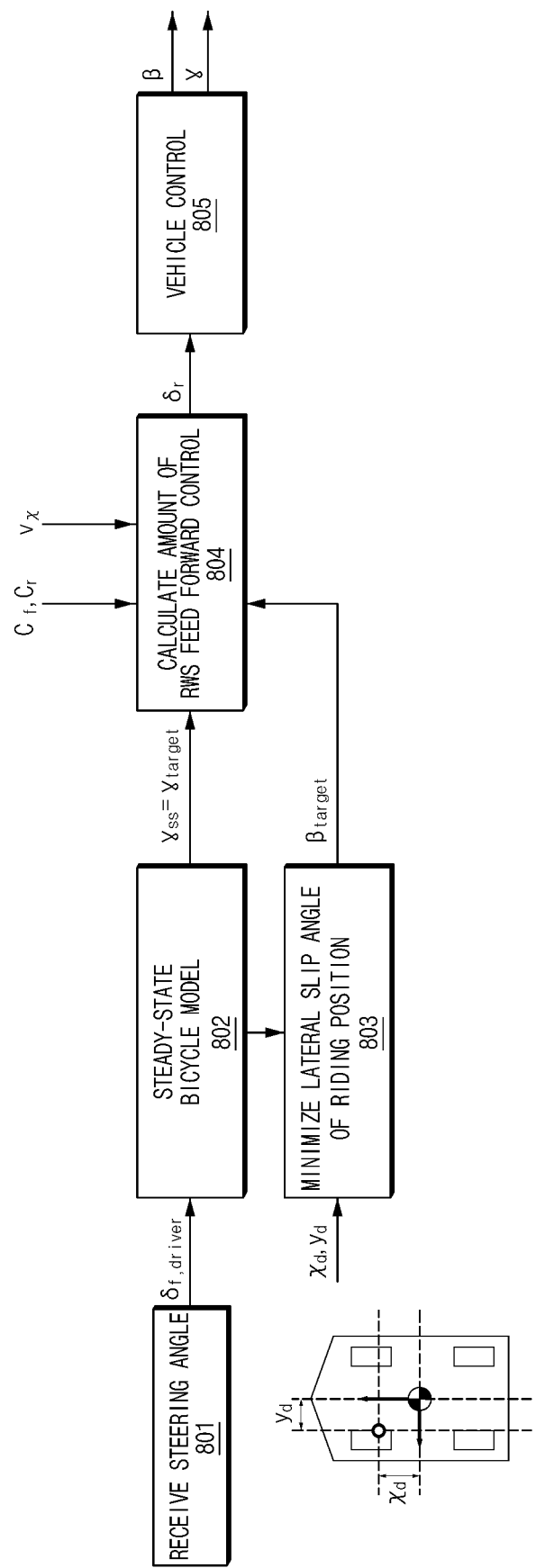
FIG. 8 is a drawing illustrating that a vehicle motion control apparatus is configured to perform feed forward control according to another exemplary embodiment of the present disclosure.

FIG. 8 is a drawing illustrating that a vehicle motion control apparatus is configured to perform feed forward control according to another exemplary embodiment of the present disclosure.

Referring to FIG. 8, in 801, a vehicle motion control apparatus 100 of FIG. 1 may receive a steering angle.

In 802, the vehicle motion control apparatus 100 may determine a target yaw rate γ_target by a steady-state bicycle model, based on the received steering angle δ_f,driver.

In 803, the vehicle motion control apparatus 100 may determine a target lateral slip angle β_target in the center of gravity, which is for minimizing a lateral slip angle of the riding position, based on a longitudinal distance x_d from the center of gravity to the riding position, a lateral distance y_d from the center of gravity to the riding position, and a target yaw rate γ_target.

Because the process in 801 to 803 is the same as a process in 701 to 703 of FIG. 7, a detailed description thereof will be omitted.

In 804, the vehicle motion control apparatus 100 may determine an amount of rear wheel steer (RWS) feed forward control, based on the target lateral slip angle β_target, a target lateral slip angular velocity β'_target, and the target yaw rate γ_target.

As an exemplary embodiment of the present disclosure, the amount of feed forward control may include an amount of control for a rear wheel steering angle δ_r.

As an exemplary embodiment of the present disclosure, when applied to a vehicle provided with an RWS system, the vehicle motion control apparatus 100 may determine the rear wheel steering angle γ_r by Equation 8 below.

$$\delta_r = \frac{-C_f(C_r L(x_d + l_r) - l_f m v_x^2)}{C_r(C_f L(-x_d + l_f) + l_r m v_x^2)}\delta_{f,driver}$$ [Equation 8]

Herein, each of C_f and C_r may refer to the cornering stiffness of each of the front wheel and the rear wheel, each of l_f and l_r may refer to the distance from the center of gravity to each of the front wheel axle and the rear wheel axle, and L may refer to the distance between the front wheel axle and the rear wheel axle.

In 805, the vehicle motion control apparatus 100 may perform vehicle control, based on the rear wheel steering angle δ_r.

As an exemplary embodiment of the present disclosure, the vehicle motion control apparatus 100 may perform rear wheel steering control by the RWS system, based on the determined rear wheel steering angle δ_r.

In the instant case, the vehicle motion control apparatus 100 may perform front wheel control based on the received steering angle δ_f,driver.

Figure 9:
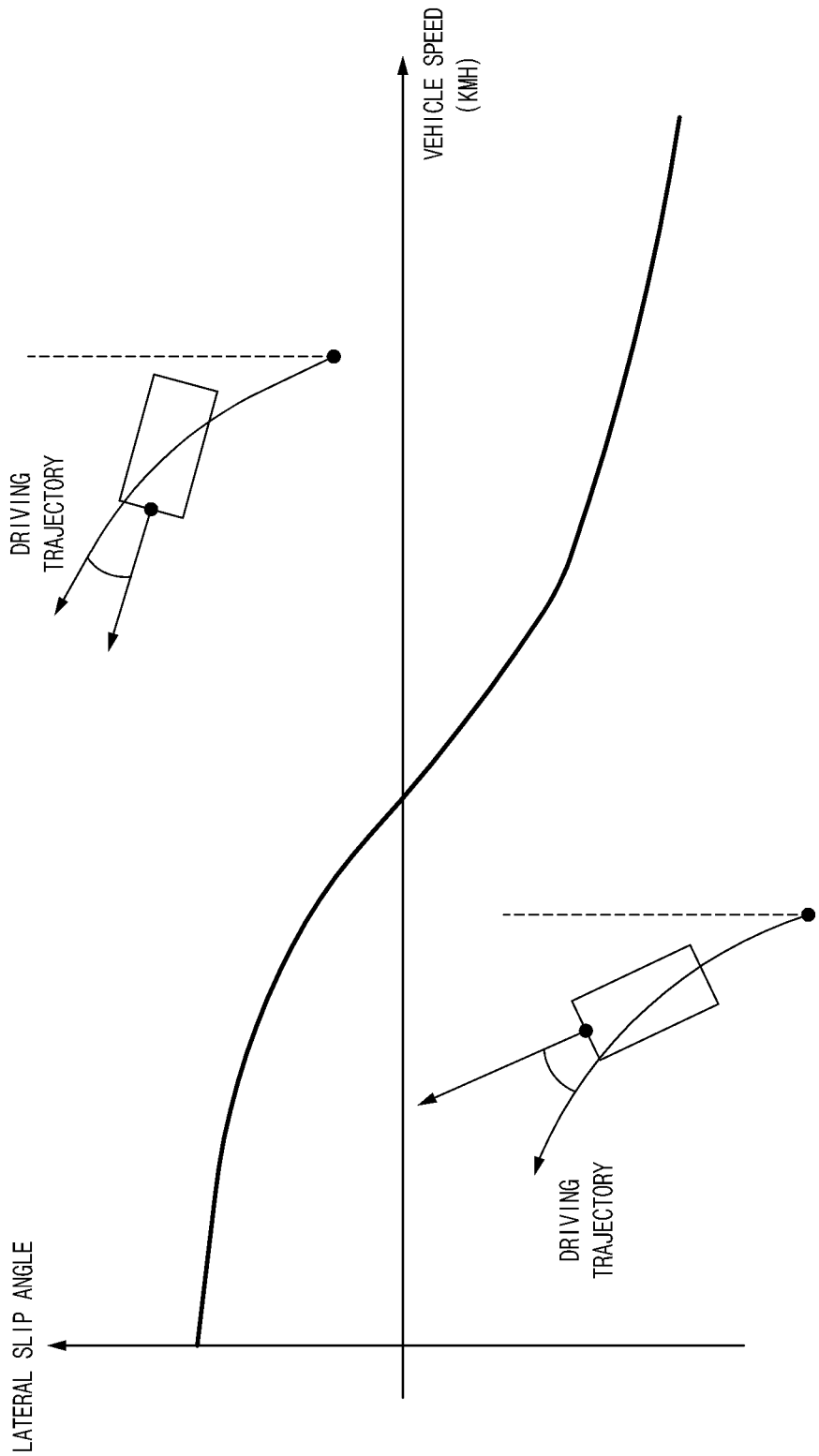
FIG. 9 is a drawing illustrating information related to a lateral slip angle for each speed according a turning motion of a vehicle.

FIG. 9 is a drawing illustrating information related to a lateral slip angle for each speed according a turning motion of a vehicle.

An x-axis on a graph shown in FIG. 9 may refer to a vehicle speed, and a y-axis may refer to a lateral slip angle.

A lateral slip direction which occurs on a turning section where the vehicle travels at a low speed and a lateral slip direction which occurs on a turning section where the vehicle travels at a high speed may be opposite to each other.

Thus, a vehicle provided with an existing RWS system may perform control for minimizing a lateral slip angle based on a steering ratio between a front wheel steering angle and a rear wheel steering angle which are determined to different degrees for each speed.

Figure 10:
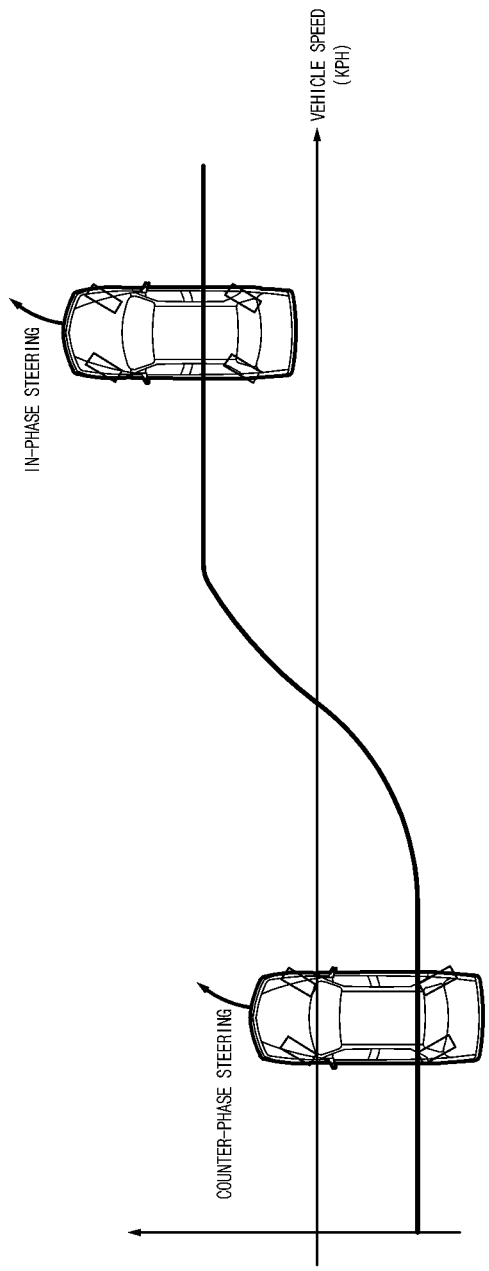
FIG. 10 is a drawing illustrating information related to a steering ratio between a front wheel and a rear wheel according to a vehicle speed used by an existing RWS system.

A description will be provided in detail of the steering ratio between the front wheel steering angle and the rear wheel steering angle which are determined to the different degrees for each speed with reference to FIG. 10.

FIG. 10 is a drawing illustrating information related to a steering ratio between a front wheel and a rear wheel according to a vehicle speed used by an existing RWS system.

Referring to FIG. 10, the existing RWS system changes a steering ratio between a front wheel and a rear wheel in a turning section where the vehicle travels at a low speed and a turning section where the vehicle travels at a high speed and performs steering control of the vehicle to minimize a lateral slip angle with respect to the center of gravity.

As an exemplary embodiment of the present disclosure, to steer the front wheel and the rear wheel at a low speed in opposite directions, the existing RWS system determines a steering angle of the rear wheel based on a steering ratio having a minus value.

As an exemplary embodiment of the present disclosure, to steer the front wheel and the rear wheel at a high speed in the same direction, the existing RWS system determines a steering angle of the rear wheel based on a steering ratio having a plus value.

The existing RWS system may multiply a front wheel steering angle by a steering ratio to determine a rear wheel steering control angle.

The existing RWS system may perform steering control of the rear wheel, using a steering angle like Equation 9 below.

$$k = -\frac{(l_f + l_r)l_r C_f C_r - m V_x^2 l_f C_f}{(l_f + l_r)l_f C_f C_r + m V_x^2 l_r C_r}$$ [Equation 9]

Herein, k may refer to the steering ratio between the front wheel steering angle and the rear wheel steering angle, each of C_f and C_r may refer to cornering stiffness of each of the front wheel and the rear wheel, each of l_f and l_r may refer to the distance from the center of gravity to each of the front wheel axle and the rear wheel axle, m may refer to the weight of the vehicle, and V_x may refer to the longitudinal speed of the vehicle.

However, because a steering ratio k used by the existing RWS system is determined on the basis of the center of gravity, it may fail to be determined to be suitable for various riding positions.

Figure 11:
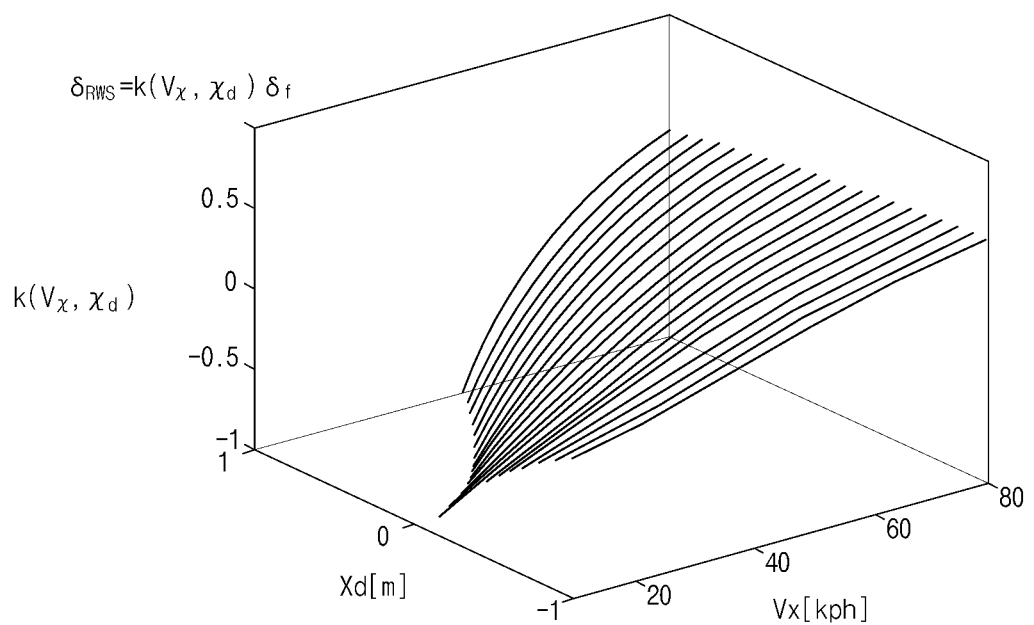
FIG. 11 is a drawing illustrating information related to a steering ratio between a front wheel and a rear wheel according to a vehicle speed used by a vehicle motion control apparatus according to an exemplary embodiment of the present disclosure.

FIG. 11 is a drawing illustrating information related to a steering ratio between a front wheel and a rear wheel according to a vehicle speed used by a vehicle motion control apparatus according to an exemplary embodiment of the present disclosure.

Referring to FIG. 11, a vehicle motion control apparatus 100 of FIG. 1 may determine a steering ratio k according to a vehicle speed and a riding position.

The vehicle motion control apparatus 100 may determine the steering ratio k corresponding to a longitudinal distance from the center of gravity of the vehicle to the riding position and a longitudinal speed of the vehicle, by a predetermined function.

As an exemplary embodiment of the present disclosure, the vehicle motion control apparatus 100 may perform steering control of the rear wheel, using a steering ratio like Equation 10 below.

$$k = \frac{-C_f(C_r L(x_d + l_r) - l_f m v_x^2)}{C_r(C_f L(-x_d + l_f) + l_r m v_x^2)} \quad \text{[Equation 10]}$$

Herein, the value meant by each variable may be defined in the same as that in Equation 9 above.

Figure 12:
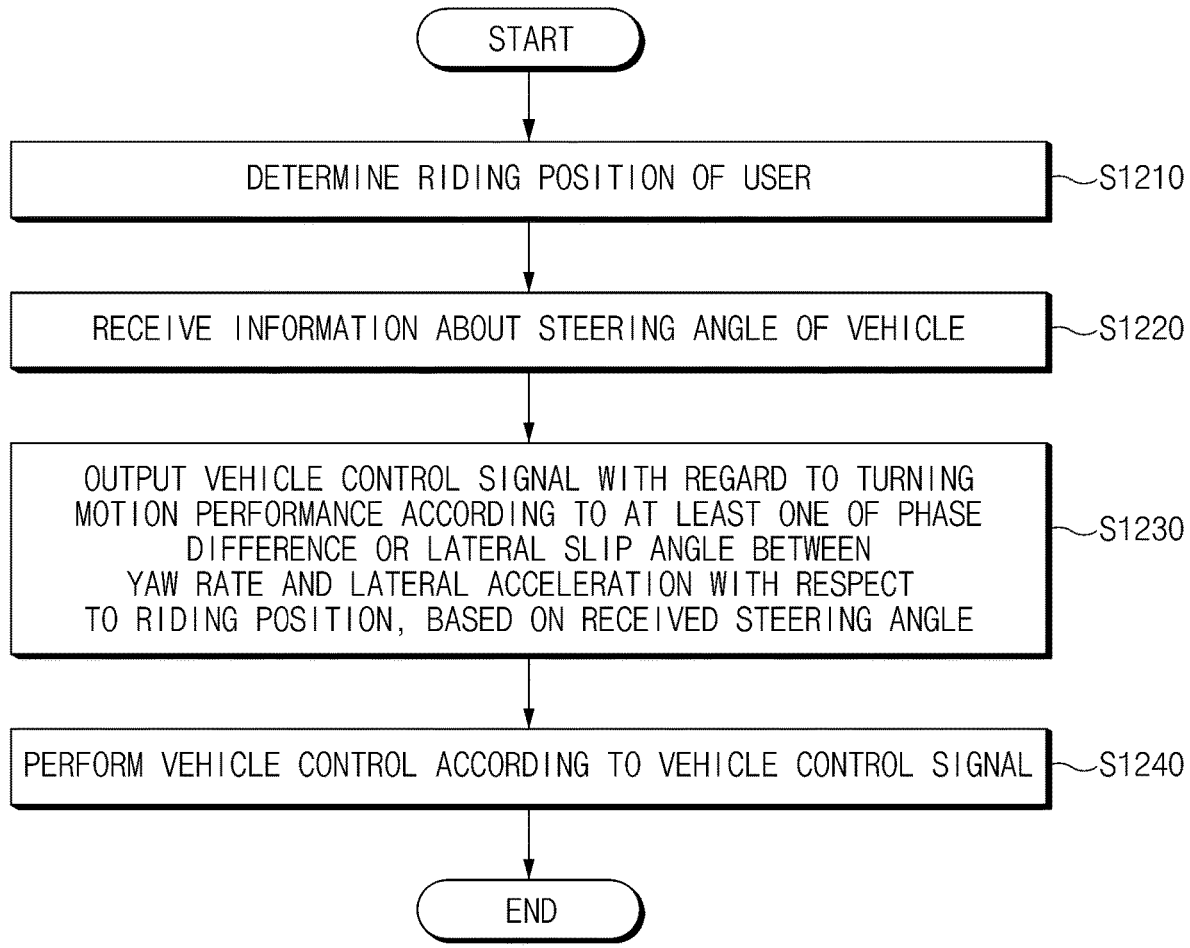
FIG. 12 is a flowchart illustrating a vehicle motion control method according to an exemplary embodiment of the present disclosure.

FIG. 12 is a flowchart illustrating a vehicle motion control method according to an exemplary embodiment of the present disclosure.

Referring to FIG. 12, the vehicle motion control method may include determining (S1210) a riding position of a user, receiving (S1220) information related to a steering angle of a vehicle, outputting (S1230) a vehicle control signal with regard to turning motion performance according to at least one of a phase difference between a yaw rate and lateral acceleration or a lateral slip angle with respect to the riding position, based on the received steering angle, and performing (S1240) vehicle control according to the vehicle control signal.

The determining (S1210) of the riding position of the user may be performed by a processor 110 of FIG. 1.

As an exemplary embodiment of the present disclosure, the vehicle motion control method may further include receiving, by an input device, information related to the riding position from the user.

As an exemplary embodiment of the present disclosure, the determining (S1210) of the riding position of the user may include determining, by the processor, the riding position, based on the information related to the riding position, which is received from the user.

As an exemplary embodiment of the present disclosure, the vehicle motion control method may further include sensing, by a seat sensor provided in the vehicle, whether the user sits on a seat of the vehicle.

As an exemplary embodiment of the present disclosure, the determining (S1210) of the riding position of the user may include determining, by the processor, the riding position, according to detecting information of the seat sensor.

The receiving (S1220) of the information related to the steering angle of the vehicle may be performed by the processor 110.

The outputting of the vehicle control signal with regard to the turning motion performance according to the at least one of the phase difference between a yaw rate and lateral acceleration or the lateral slip angle with respect to the riding position, based on the received steering angle, may be performed by the processor 110.

As an exemplary embodiment of the present disclosure, the outputting (S1230) of the vehicle control signal may include outputting, by the processor, the vehicle control signal including at least one of a steering signal, a driving signal, or a braking signal for the vehicle.

As an exemplary embodiment of the present disclosure, the outputting (S1230) of the vehicle control signal may include determining, by the processor, a target behavior of the center of gravity of the vehicle, which is for minimizing at least one of a phase difference between a yaw rate and lateral acceleration or a lateral slip angle of the riding position.

As an exemplary embodiment of the present disclosure, the determining of the target behavior of the center of gravity of the vehicle by the processor may include determining, by the processor, a target yaw rate of the center of gravity by a steady-state dynamics model, based on the received steering angle and determining, by the processor, at least one of a target lateral slip angle or a target lateral slip angular velocity of the center of gravity, based on the determined target yaw rate, a lateral distance from the center of gravity to the riding position, and a longitudinal distance from the center of gravity to the riding position.

As an exemplary embodiment of the present disclosure, the outputting (S1230) of the vehicle control signal may include determining, by the processor, a front wheel steering angle and a rear wheel steering angle of the vehicle, by an inverse dynamics model, based on the lateral slip angle, the target lateral slip angular velocity, and the target yaw rate of the center of gravity.

As an exemplary embodiment of the present disclosure, the outputting (S1230) of the vehicle control signal may determining, by the processor, a front wheel steering angle of the vehicle, based on the received steering angle, determining, by the processor, a steering ratio, based on a lateral speed of the vehicle and a lateral distance from the center of gravity of the vehicle to the riding position, and determining, by the processor, a rear wheel steering angle of the vehicle, based on the front wheel steering angle and the steering ratio.

The performing (S1240) of the vehicle control according to the vehicle control signal may be performed by the controller 120.

As an exemplary embodiment of the present disclosure, the performing (S1240) of the vehicle control may include performing, by the controller, at least one of steering control, driving control, or braking control of the vehicle, in accordance in accordance with the vehicle control signal.

As an exemplary embodiment of the present disclosure, the vehicle motion control method may further include obtaining, by the sensor device provided in the vehicle, information related to at least one of a wheel speed, longitudinal acceleration, lateral acceleration, a yaw rate, a steering angle, a driving torque, or a braking torque of the vehicle and feeding back, by the processor, the vehicle control signal, based on the target behavior for the center of gravity and the information obtained by the sensor device.

The operations of the method or the algorithm described in connection with the exemplary embodiments included herein may be embodied directly in hardware or a software module executed by the processor or in a combination thereof. The software module may reside on a storage medium (that is, the memory/or the storage) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

A description will be provided of effects of the vehicle motion control apparatus and the method thereof according to an exemplary embodiment of the present disclosure.

According to at least one of embodiments of the present disclosure, the apparatus and the method may be provided to control motion of the vehicle to improve turning motion performance.

Furthermore, according to at least one of embodiments of the present disclosure, the vehicle motion control apparatus and the method thereof may be provided to provide a passenger of an autonomous vehicle with optimal turning motion performance.

Furthermore, according to at least one of embodiments of the present disclosure, the vehicle motion control apparatus and the method thereof may be provided to optimize a lateral slip angle of the vehicle with respect to the riding position.

Furthermore, according to at least one of embodiments of the present disclosure, the vehicle motion control apparatus and the method thereof may be provided to optimize a phase difference between a yaw rate and lateral acceleration of the vehicle with respect to the riding position.

Furthermore, according to at least one of embodiments of the present disclosure, the vehicle motion control apparatus and the method thereof may be provided to improve turning motion performance for future mobility with a predetermined degree of freedom of control.

Furthermore, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle motion control apparatus, comprising:
a processor provided in a vehicle and configured to determine a riding position of a user, receive information related to a steering angle of the vehicle, and output a vehicle control signal with regard to turning motion performance according to at least one of a phase difference between a yaw rate and lateral acceleration or a lateral slip angle with respect to the riding position, based on the received steering angle; and
a controller configured to control the vehicle in accordance with the vehicle control signal,
wherein the processor is configured to:
determine a front wheel steering angle of the vehicle based on the received steering angle,
determine a steering ratio, based on a longitudinal speed of the vehicle and a longitudinal distance from the center of gravity of the vehicle to the riding position, and
determine a rear wheel steering angle of the vehicle, based on the front wheel steering angle and the steering ratio.

2. The vehicle motion control apparatus of claim 1, further including:
an input device configured to receive information related to the riding position from the user,
wherein the processor is configured to determine the riding position, based on the information related to the riding position, the information being received from the user.

3. The vehicle motion control apparatus of claim 1, further including:
a seat sensor configured to detect whether the user sits on a seat of the vehicle,
wherein the processor is configured to determine the riding position, according to detecting information of the seat sensor.

4. The vehicle motion control apparatus of claim 1,
wherein the processor is configured to output the vehicle control signal including at least one of a steering signal, a driving signal, or a braking signal for the vehicle, and
wherein the controller is configured to perform at least one of steering control, driving control, or braking control of the vehicle in accordance with the vehicle control signal.

5. The vehicle motion control apparatus of claim 1, wherein the processor is configured to determine a target behavior of the center of gravity of the vehicle, the target behavior being for minimizing the at least one of the phase difference between the yaw rate and the lateral acceleration or the lateral slip angle of the riding position.

6. The vehicle motion control apparatus of claim 5, wherein the target behavior of the center of gravity includes at least one of a target lateral slip angle, a target lateral slip angular velocity, or a target yaw rate of the center of gravity.

7. The vehicle motion control apparatus of claim 5, wherein the processor is configured to determine a target yaw rate of the center of gravity by a steady-state dynamics model, based on the received steering angle.

8. The vehicle motion control apparatus of claim 7, wherein the processor is configured to determine at least one of a target lateral slip angle or a target lateral slip angular velocity of the center of gravity, based on the determined target yaw rate, a lateral distance from the center of gravity to the riding position, and the longitudinal distance from the center of gravity to the riding position.

9. The vehicle motion control apparatus of claim 8, wherein the processor is configured to determine a front wheel steering angle and a rear wheel steering angle of the vehicle by an inverse dynamics model, based on the lateral slip angle, the target lateral slip angular velocity, and the target yaw rate of the center of gravity.

10. The vehicle motion control apparatus of claim 5, further including:
a sensor device configured to obtain information related to at least one of a wheel speed, longitudinal acceleration, the lateral acceleration, the yaw rate, the steering angle, a driving torque, or a braking torque of the vehicle,
wherein the processor is configured to feed back the vehicle control signal, based on the target behavior of the center of gravity and the information obtained by the sensor device.

11. A vehicle motion control method, comprising:
determining, by a processor provided in a vehicle, a riding position of a user;
receiving, by the processor, information related to a steering angle of the vehicle;
outputting, by the processor, a vehicle control signal with regard to turning motion performance according to at least one of a phase difference between a yaw rate and lateral acceleration or a lateral slip angle with respect to the riding position, based on the received steering angle; and
controlling, by a controller, the vehicle in accordance with the vehicle control signal,
wherein the outputting of the vehicle control signal by the processor includes:
determining, by the processor, a front wheel steering angle of the vehicle, based on the received steering angle;
determining, by the processor, a steering ratio, based on a longitudinal speed of the vehicle and a longitudinal distance from the center of gravity of the vehicle to the riding position; and
determining, by the processor, a rear wheel steering angle of the vehicle, based on the front wheel steering angle and the steering ratio.

12. The vehicle motion control method of claim 11, further including:
receiving, by an input device, information related to the riding position from the user,
wherein the determining of the riding position of the user by the processor includes:
determining, by the processor, the riding position, based on the information related to the riding position, the information being received from the user.

13. The vehicle motion control method of claim 11, further including:
detecting, by a seat sensor provided in the vehicle, whether the user sits on a seat of the vehicle,
wherein the determining of the riding position of the user by the processor includes:
determining, by the processor, the riding position, according to detecting information of the seat sensor.

14. The vehicle motion control method of claim 11, wherein the outputting of the vehicle control signal by the processor includes:
outputting, by the processor, the vehicle control signal including at least one of a steering signal, a driving signal, or a braking signal for the vehicle, and
wherein the performing of the vehicle control according to the vehicle control signal by the controller includes:
performing, by the controller, at least one of steering control, driving control, or braking control of the vehicle in accordance with the vehicle control signal.

15. The vehicle motion control method of claim 11, wherein the outputting of the vehicle control signal by the processor includes:
determining, by the processor, a target behavior of the center of gravity of the vehicle, the target behavior being for minimizing the at least one of the phase difference between the yaw rate and the lateral acceleration or the lateral slip angle of the riding position.

16. The vehicle motion control method of claim 15, wherein the determining of the target behavior of the center of gravity of the vehicle by the processor includes:
determining, by the processor, a target yaw rate of the center of gravity by a steady-state dynamics model, based on the received steering angle; and
determining, by the processor, at least one of a target lateral slip angle or a target lateral slip angular velocity of the center of gravity, based on the determined target yaw rate, a lateral distance from the center of gravity to the riding position, and the longitudinal distance from the center of gravity to the riding position.

17. The vehicle motion control method of claim 16, wherein the outputting of the vehicle control signal by the processor further includes:
determining, by the processor, the front wheel steering angle and the rear wheel steering angle of the vehicle by an inverse dynamics model, based on the lateral slip angle, the target lateral slip angular velocity, and the target yaw rate of the center of gravity.

18. The vehicle motion control method of claim 15, further including:
obtaining, by a sensor device provided in the vehicle, information related to at least one of a wheel speed, longitudinal acceleration, the lateral acceleration, the yaw rate, the steering angle, a driving torque, or a braking torque of the vehicle; and
feeding back, by the processor, the vehicle control signal, based on the target behavior of the center of gravity and the information obtained by the sensor device.

* * * * *